US010166955B2

(12) United States Patent
Tateno et al.

(10) Patent No.: US 10,166,955 B2
(45) Date of Patent: Jan. 1, 2019

(54) MANUAL RELEASE DEVICE FOR PARKING LOCK MECHANISM

(71) Applicant: TOYOTA JIDOSHA KABUSHIKI KAISHA, Toyota-shi, Aichi-ken (JP)

(72) Inventors: Hiroyuki Tateno, Nagoya (JP); Kiyonori Takagi, Okazaki (JP); Koichi Okuda, Toyota (JP); Atsushi Kawamoto, Toyota (JP); Ryuji Ibaraki, Miyoshi (JP); Yuji Yasuda, Miyoshi (JP); Haruhisa Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/725,229

(22) Filed: Oct. 4, 2017

(65) Prior Publication Data

US 2018/0141525 A1     May 24, 2018

(30) Foreign Application Priority Data

Nov. 22, 2016 (JP) ................................. 2016-226699

(51) Int. Cl.
*B60T 7/10* (2006.01)
*B60T 1/00* (2006.01)
*F16H 63/34* (2006.01)
*F16D 121/16* (2012.01)
*F16D 127/04* (2012.01)

(52) U.S. Cl.
CPC .............. *B60T 7/104* (2013.01); *B60T 1/005* (2013.01); *F16H 63/3466* (2013.01); *F16D 2121/16* (2013.01); *F16D 2127/04* (2013.01)

(58) Field of Classification Search
CPC .. B60T 1/005; F16H 63/3466; F16D 2127/04; F16D 2121/16
USPC ...... 188/2 D, 31, 69; 192/219.4–219.6, 220.2
See application file for complete search history.

(56) References Cited

U.S. PATENT DOCUMENTS 4,421,214 A * 12/1983 Sellmeyer ............... B60T 7/047
                                                      192/219.7
4,841,798 A *  6/1989 Porter ..................... B60T 7/047
                                                       74/501.5 R (Continued)

FOREIGN PATENT DOCUMENTS

JP     2004-230952 A    8/2004
JP     2013-170699 A    9/2013

*Primary Examiner* — Thomas J Williams
*Assistant Examiner* — Mariano Sy
(74) *Attorney, Agent, or Firm* — Oliff PLC

(57) ABSTRACT

A manual release device for a parking lock mechanism includes an operating lever, a cable and an idle motion mechanism. The idle motion mechanism includes a body portion, a lever provided on the body portion, a helical compression spring, and a contact portion provided on the shaft. The cable is coupled to the lever. A distal end of the lever is arranged below a turning center of the lever. The parking lock mechanism is configured, when the parking lock mechanism is in a locked state, to be switched into an unlocked state as the body portion contacts the contact portion to cause the shaft to turn when the lever is turned against an urging force of the urging member as a result of operation of the operating lever to cause the body portion to turn from the normal position to the actuated position.

3 Claims, 6 Drawing Sheets

(56) References Cited

U.S. PATENT DOCUMENTS

| | | | | |
|---|---|---|---|---|
| 5,624,352 | A | * | 4/1997 | Smale ................... B60R 25/08 192/220.2 |
| 5,704,457 | A | * | 1/1998 | Kimura ................ B60K 37/06 192/220.2 |
| 6,273,232 | B1 | * | 8/2001 | Kimura ................ B60K 37/06 192/219.6 |
| 6,550,354 | B2 | * | 4/2003 | Kim ..................... B60T 7/047 74/512 |
| 7,370,547 | B2 | * | 5/2008 | Amamiya .............. F16H 61/32 74/335 |
| 7,731,007 | B2 | * | 6/2010 | Kusamoto .......... F16H 63/3416 192/219.5 |
| 7,735,619 | B2 | * | 6/2010 | Kato ................. F16H 63/3416 188/31 |
| 8,490,770 | B2 | * | 7/2013 | Schwekutsch ...... F16H 63/3416 192/219.5 |
| 8,720,660 | B2 | * | 5/2014 | Kimura ................. B60T 1/005 192/219.5 |
| 9,205,813 | B2 | * | 12/2015 | Yokota ............... F16H 63/3416 |

* cited by examiner

MANUAL RELEASE DEVICE FOR PARKING LOCK MECHANISM

INCORPORATION BY REFERENCE

The disclosure of Japanese Patent Application No. 2016-226699 filed on Nov. 22, 2016 including the specification, drawings and abstract is incorporated herein by reference in its entirety.

BACKGROUND

1. Technical Field

The disclosure relates to a manual release device for a parking lock mechanism.

2. Description of Related Art

There is known a parking lock system that is able to be switched by a motor between a locked state and an unlocked state (see, for example, Japanese Patent Application Publication No. 2013-170699 (JP 2013-170699 A)). The parking lock system is switched between the locked state and the unlocked state when a detent plate is driven by the motor.

The parking lock system described in JP 2013-170699 A includes a manual release mechanism for forcibly switching the parking lock system into the unlocked state manually. The manual release mechanism includes an operating cable coupled to the detent plate, and is configured to be able to drive the detent plate with the use of the operating cable. Thus, even when the motor becomes inoperable, it is possible to switch the parking lock system into the unlocked state.

SUMMARY

It is conceivable that a manual release mechanism includes an operating lever, a cable coupled to the operating lever, and an idle motion mechanism that is provided between the cable and the detent plate, as an example of the manual release mechanism. The idle motion mechanism includes a body portion, a lever and an urging member. The body portion is turnable between a normal position and an actuated position. The lever is provided on the body portion. The cable is coupled to the lever. The urging member urges the lever such that the body portion is located in the normal position. In the thus configured manual release mechanism, when the parking lock system is in the locked state, at the time when the operating lever is operated to cause the lever of the idle motion mechanism to move against the urging force of the urging member and, as a result, the body portion is turned from the normal position to the actuated position, an operational force is transmitted to the detent plate to switch the parking lock system into the unlocked state.

If the urging member that urges the lever of the idle motion mechanism is provided as described above, it is desired to improve the durability of the urging member.

The disclosure provides a manual release device for a parking lock mechanism, which is able to improve the durability of an urging member that urges a lever of an idle motion mechanism.

An aspect of the disclosure provides a manual release device for a parking lock mechanism that is configured to be switched by an actuator between a locked state and an unlocked state, the parking lock mechanism being configured to be manually switched into the unlocked state when the parking lock mechanism is in the locked state. The manual release device includes: an operating lever; a cable coupled to the operating lever; and an idle motion mechanism provided between the cable and a shaft that is configured to be turned by the actuator. The idle motion mechanism includes a body portion, a lever and an urging member. The body portion is configured to turn between a normal position and an actuated position. The lever is provided on the body portion. The urging member urges the lever such that the body portion is located in the normal position. The contact portion is provided on the shaft. The cable is coupled to the lever. A distal end of the lever is arranged below a turning center of the lever. The parking lock mechanism is configured to, when the parking lock mechanism is in the locked state, be switched into the unlocked state as the body portion contacts the contact portion to cause the shaft to turn when the lever is turned against an urging force of the urging member as a result of operation of the operating lever to cause the body portion to turn from the normal position to the actuated position.

With the above configuration, it is possible to reduce a load input to the urging member due to the self weight of the lever by arranging the distal end of the lever below the turning center of the lever, so it is possible to improve the durability of the urging member.

In the manual release device, the lever may be arranged on a vehicle front side with respect to the urging member. The lever may be urged toward the vehicle front side by the urging member.

With the above configuration, it is possible to suppress input of the inertia force of the lever to the urging member, so it is possible to improve the durability of the urging member. The inertia force of the lever is generated by an acceleration (negative acceleration) at the time when the vehicle is decelerated. The inertia force of the lever, which is generated by an acceleration (positive acceleration) at the time when the vehicle is accelerated, is input to the urging member; however, the inertia force that is generated during acceleration tends to be smaller than the inertia force that is generated during deceleration, so it is not problematic.

In the manual release device, when the parking lock mechanism is switched from the locked state to the unlocked state as a result of operation of the operating lever, at the time when a torque required to turn the shaft is maximum, a tangential direction when the lever turns may coincide with a moving direction of a portion of the cable. The portion of the cable may be a portion at which the cable is coupled to the lever.

With this configuration, it is possible to efficiently exert an operational force (a force that pulls the cable with the use of the operating lever) on the lever at the time when a torque that is required to turn the shaft is maximum, so it is possible to suppress an increase in operational force that is required to turn the shaft. Thus, it is not required to increase the load capacity of the cable, so it is possible to suppress an increase in the size of the cable.

With the manual release device according to the aspect of the disclosure, it is possible to improve the durability of the urging member that urges the lever of the idle motion mechanism.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings. The case where the disclosure is applied to a manual release device for a parking lock system of a front-engine rear-drive (FR) vehicle will be described below.

The parking lock system includes a parking lock mechanism 1 and the manual release device 2. The manual release device 2 is used to manually release the parking lock mechanism 1.

Parking Lock Mechanism

Initially, the schematic configuration of the parking lock mechanism 1 will be described with reference to FIG. 1 and FIG. 2.

The parking lock mechanism 1 is configured to be able to be switched between a locked state (P position) and an unlocked state (NP position). In the locked state, a power transmission shaft 3a is set so as to be non-rotatable. In the unlocked state, the power transmission shaft 3a is set so as to be rotatable. FIG. 1 shows the unlocked state. FIG. 2 shows the locked state. The power transmission shaft 3a is, for example, provided in an automatic transmission 3 (see FIG. 4) of the vehicle, and is configured to transmit power for propelling the vehicle.

Figure 1:
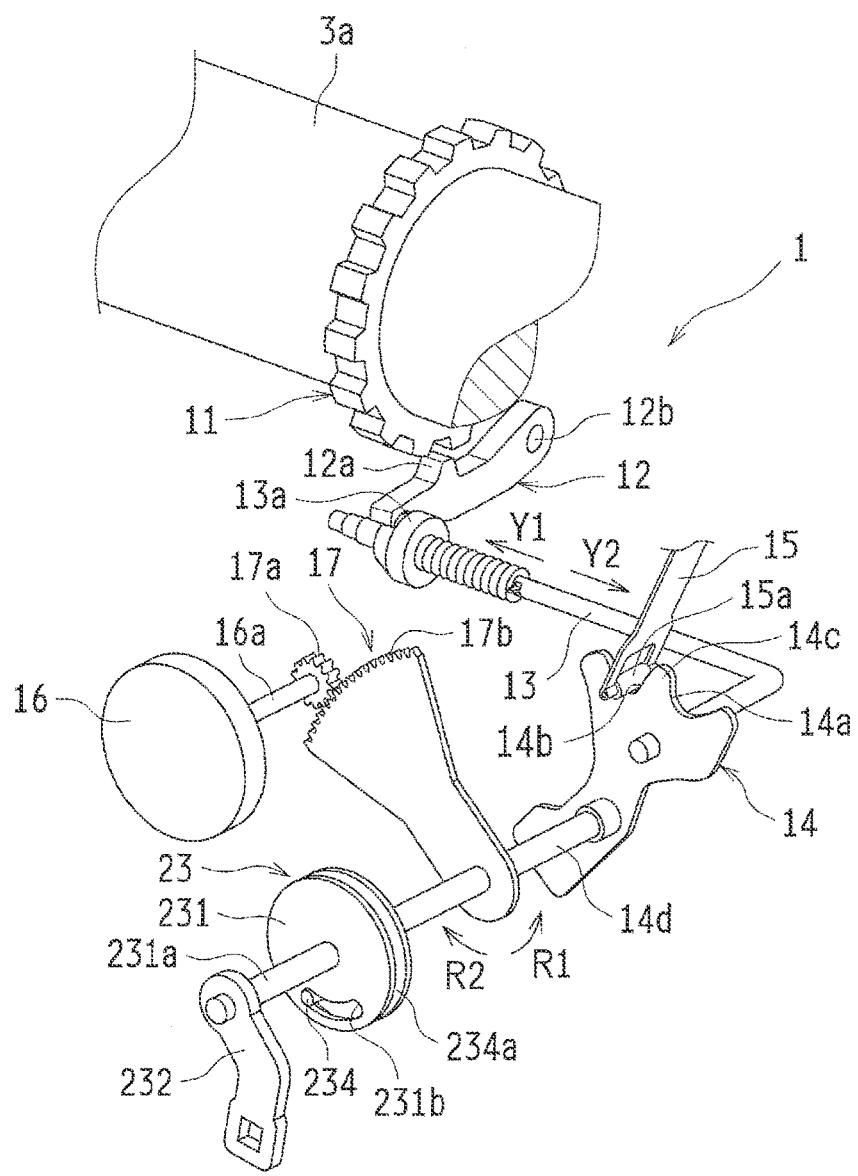
FIG. 1 is a schematic configuration view that shows a parking lock mechanism according to an embodiment.
Figure 2:
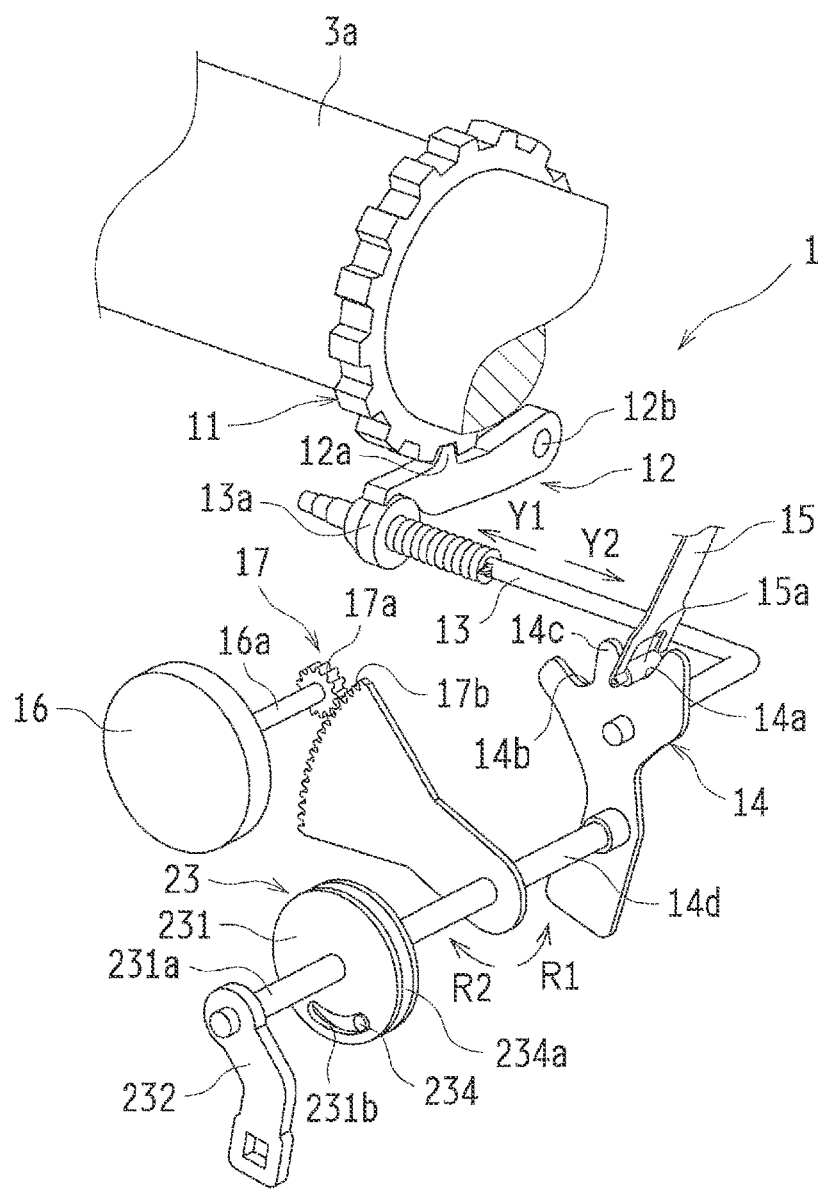
FIG. 2 is a view in which the parking lock mechanism shown in FIG. 1 has been switched into a locked state.

As shown in FIG. 1 and FIG. 2, the parking lock mechanism 1 includes a parking gear 11, a parking pawl 12, a parking rod 13, a detent plate 14, a detent spring 15, an electric motor 16 and a reduction mechanism 17.

The parking gear 11 is provided around the power transmission shaft 3a, and is configured to rotate integrally with the power transmission shaft 3a.

The parking pawl 12 is arranged near the lower side of the parking gear 11. The parking pawl 12 has a protrusion 12a that is able to mesh with the parking gear 11. The parking pawl 12 is turnable about a spindle 12b, and is urged by a return spring (not shown) away from the parking gear 11.

One end of the parking rod 13 is coupled to the detent plate 14. A cam 13a is provided at the other end of the parking rod 13. The cam 13a is arranged on the lower side of the parking pawl 12 at a side opposite from the spindle 12b. The parking rod 13 is configured to move in the axial direction at the time when the detent plate 14 turns.

The detent plate 14 is integrated with a shaft 14d. The detent plate 14 is configured to be turned by the shaft 14d. The detent plate 14 has a P trough 14a and an NP trough 14b along a turning direction on both sides of a crest 14c. The shaft 14d is an example of the shaft according to the disclosure.

The detent spring 15 is, for example, a leaf spring. The detent spring 15 is provided in order to hold the position of the detent plate 14. A roller 15a is rotatably provided at the distal end of the detent spring 15. The roller 15a is engaged with any one of the P trough 14a and the NP trough 14b.

The electric motor 16 is coupled to the shaft 14d via the reduction mechanism 17. The electric motor 16 is configured to turn the shaft 14d and the detent plate 14 in response to a control signal from an ECU (not shown). The electric motor 16 is an example of the actuator according to the disclosure.

The reduction mechanism 17 is configured to reduce the speed of the output of the electric motor 16 and transmit the output power to the shaft 14d. The reduction mechanism 17 includes a small-diameter gear 17a and a fan-shaped large-diameter gear 17b. The small-diameter gear 17a is provided on an output shaft 16a of the electric motor 16. The large-diameter gear 17b is provided on the shaft 14d. The small-diameter gear 17a rotates integrally with the output shaft 16a, and the large-diameter gear 17b turns integrally with the shaft 14d. The small-diameter gear 17a and the large-diameter gear 17b are in mesh with each other.

Next, the operation of the parking lock mechanism 1 will be described.

Initially, as the ECU requests the parking lock mechanism 1 to switch into the locked state (P position) when the parking lock mechanism 1 is in the unlocked state (NP position) shown in FIG. 1, the large-diameter gear 17b is turned in an R1 direction by the electric motor 16. Thus, the shaft 14d and the detent plate 14 are turned in the R1 direction, and the parking rod 13 is moved in a Y1 direction. For this reason, the parking pawl 12 is pushed up by the cam 13a of the parking rod 13 against the urging force of the return spring, and the protrusion 12a of the parking pawl 12 is meshed with the parking gear 11. Thus, as shown in FIG. 2, the parking lock mechanism 1 is placed in the locked state where the power transmission shaft 3a is non-rotatable. At this time, the roller 15a of the detent spring 15 is engaged with the P trough 14a of the detent plate 14, so the position of the detent plate 14 is retained, and the locked state is kept.

As the ECU requests the parking lock mechanism 1 to switch into the unlocked state when the parking lock mechanism 1 is in the locked state shown in FIG. 2, the large-diameter gear 17b is turned in an R2 direction by the electric motor 16. Thus, the shaft 14d and the detent plate 14 are turned in the R2 direction, and the parking rod 13 is moved in a Y2 direction. For this reason, a large-diameter portion of the cam 13a retracts from a region below the parking pawl 12, so the parking pawl 12 is pushed down by the urging force of the return spring, and the protrusion 12a of the parking pawl 12 is disengaged from the parking gear 11. Thus, as shown in FIG. 1, the parking lock mechanism 1 is placed in the unlocked state where the power transmission shaft 3a is rotatable. At this time, the roller 15a of the detent spring 15 is engaged with the NP trough 14b of the detent plate 14, so the position of the detent plate 14 is retained, and the unlocked state is kept.

Manual Release Device

Next, the manual release device 2 according to the embodiment of the disclosure will be described with reference to FIG. 1 to FIG. 6.

Figure 3:
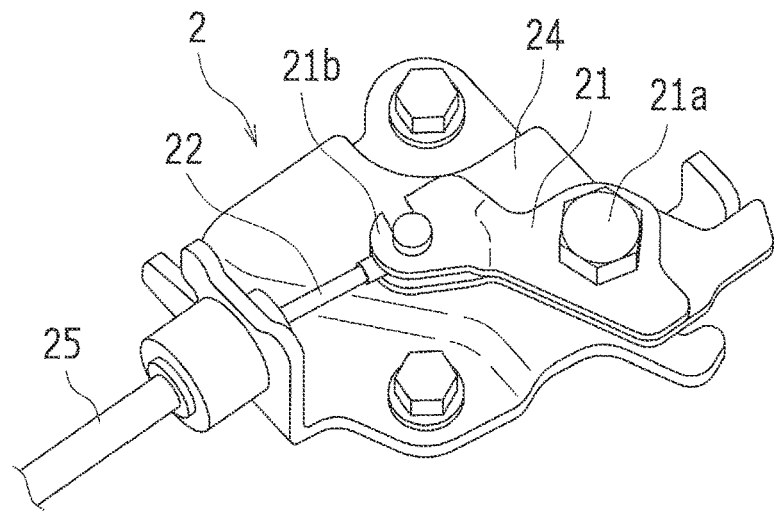
FIG. 3 is a perspective view that shows an operating lever of a manual release device according to the embodiment.

The manual release device 2 is provided in order to forcibly switch the parking lock mechanism 1 in the locked state into the unlocked state manually. A situation in which it is required to switch the parking lock mechanism 1 into the unlocked state manually includes, for example, a failure of the electric motor 16 (see FIG. 1 and FIG. 2), the dead battery, and the like. As shown in FIG. 3, the manual release device 2 includes an operating lever 21, a cable 22 and an idle motion mechanism 23 (see FIG. 1 and FIG. 2).

The operating lever 21 is provided on a housing 24 so as to be turnable. A hexagonal protrusion 21a is provided at the turning center of the operating lever 21 when viewed in a turning axis direction, that is, when viewed in plan. The protrusion 21a is configured to be able to be coupled to a tool 100 (see FIG. 7) (described later). A holding portion 21b that holds the cable 22 is formed at the distal end of the operating lever 21.

Figure 4:
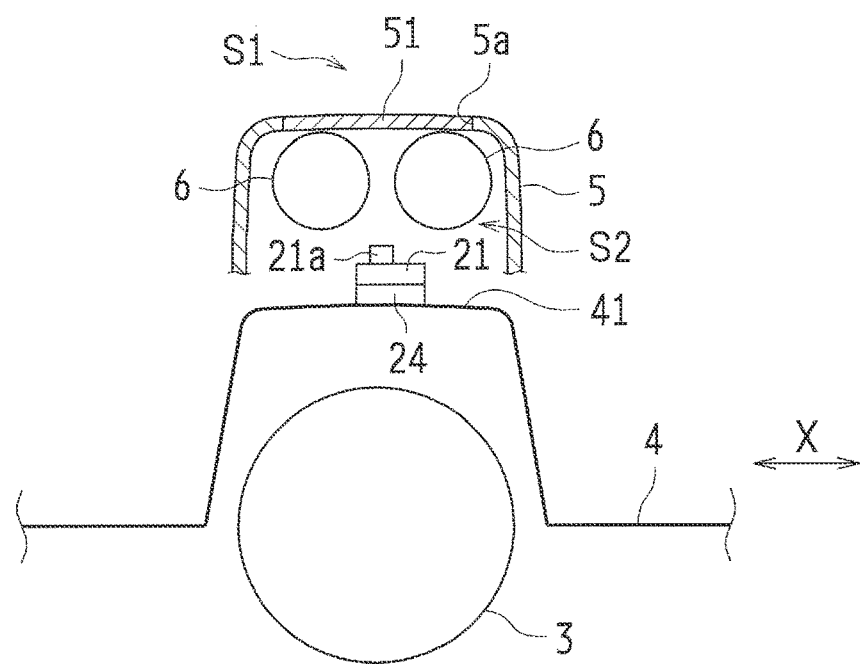
FIG. 4 is a schematic view for illustrating the position of the operating lever shown in FIG. 3.
Figure 5:
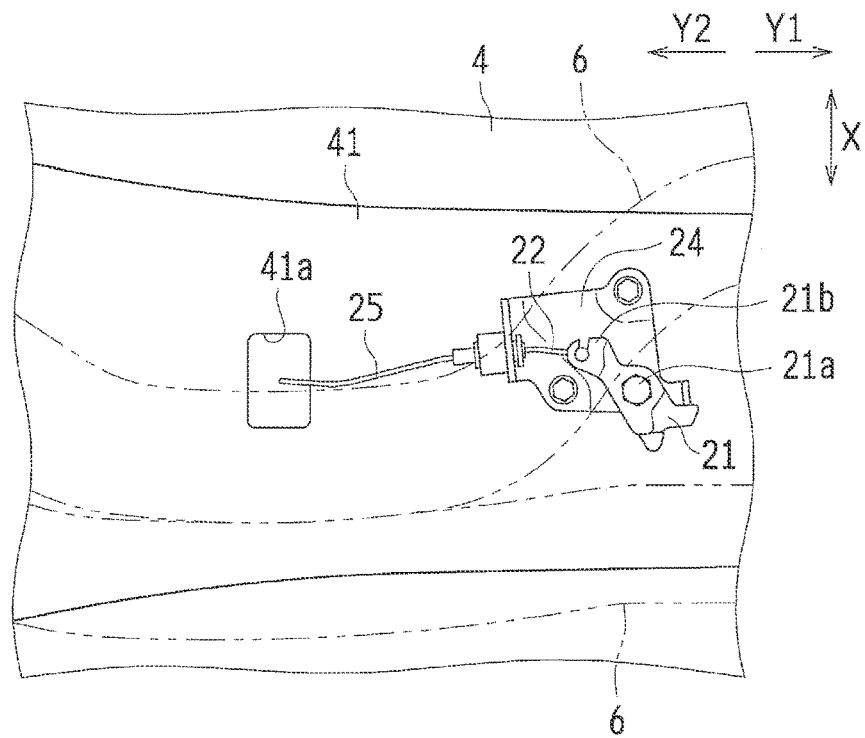
FIG. 5 is a plan view for illustrating a positional relationship between the operating lever shown in FIG. 3 and an air conditioner duct.

As shown in FIG. 4 and FIG. 5, the housing 24 is fixed to a floor tunnel 41 of a floor panel 4. For this reason, the operating lever 21 is provided in the floor tunnel 41 via the housing 24. Therefore, the operating lever 21 is configured to turn along the surface of the floor tunnel 41. The turning center of the operating lever 21 is arranged at substantially the center of the floor tunnel 41 in the width direction (X direction). The floor tunnel 41 is formed so as to extend in the longitudinal direction of the vehicle. The automatic transmission 3, a propeller shaft (not shown), and the like, are arranged below the floor tunnel 41.

As shown in FIG. 4, an interior member (decorative member) 5 is provided above the floor tunnel 41. The interior member 5 is, for example, a center console provided between a driver seat and a front passenger seat. The interior member 5 is configured to partition a living space S1 of a vehicle cabin and the outside of the living space from each other. The interior member 5 has an opening 5a at a position corresponding to the operating lever 21 in plan view. A cover 51 is detachably attached to the opening 5a. The cover 51 closes the opening 5a.

Air conditioner ducts 6, the ECU (not shown), and the like, in addition to the operating lever 21 are arranged in a space S2 between the floor tunnel 41 and the interior member 5. The air conditioner ducts 6 are provided in order to deliver air-conditioned air (cold air and warm air) toward a rear seat side. As shown in FIG. 5, the air conditioner ducts 6 are formed so as to extend in the longitudinal direction of the vehicle. The air conditioner ducts 6 are arranged at a position that does not overlap with the turning center of the operating lever 21 in plan view. The air conditioner ducts 6 are arranged above the major portion of the housing 24 and the holding portion 21b of the operating lever 21. The major portion of the housing 24 and the holding portion 21b of the operating lever 21 are hidden below the air conditioner ducts 6 in plan view.

The cable 22 is provided in order to transmit an operational force to the idle motion mechanism 23 when the operating lever 21 is operated (turned). One end of the cable 22 is coupled to the operating lever 21, and the other end of the cable 22 is coupled to the idle motion mechanism 23. The cable 22 is accommodated inside a cable housing 25 so as to be movable. One end of the cable housing 25 is coupled to the housing 24. The cable 22 pulled out from the one end is coupled to the operating lever 21. The cable housing 25 is guided to the lower side of the floor tunnel 41 via the opening 41a formed in the floor tunnel 41. The other end 25a of the cable housing 25 is connected to a bracket 26 (see FIG. 6). The opening 41a is arranged substantially in the middle of the floor tunnel 41 in the vehicle width direction.

As shown in FIG. 1 and FIG. 2, the idle motion mechanism 23 is provided between the cable 22 (see FIG. 6) and the shaft 14d. The idle motion mechanism 23 includes a body portion 231, a lever 232, a helical compression spring 233 (see FIG. 6) and a contact portion 234.

The body portion 231 is, for example, a circular plate. A shaft 231a is integrated with the center of the body portion 231. The shaft 231a is arranged coaxially with the shaft 14d. The body portion 231 is turnable about the shaft 231a. The body portion 231 is relatively turnable with respect to the shaft 14d, and is configured to turn between a normal position and an actuated position. In FIG. 1 and FIG. 2, the body portion 231 is arranged in the normal position. The body portion 231 has a cutout portion 231b that extends along the turning direction.

Figure 6:
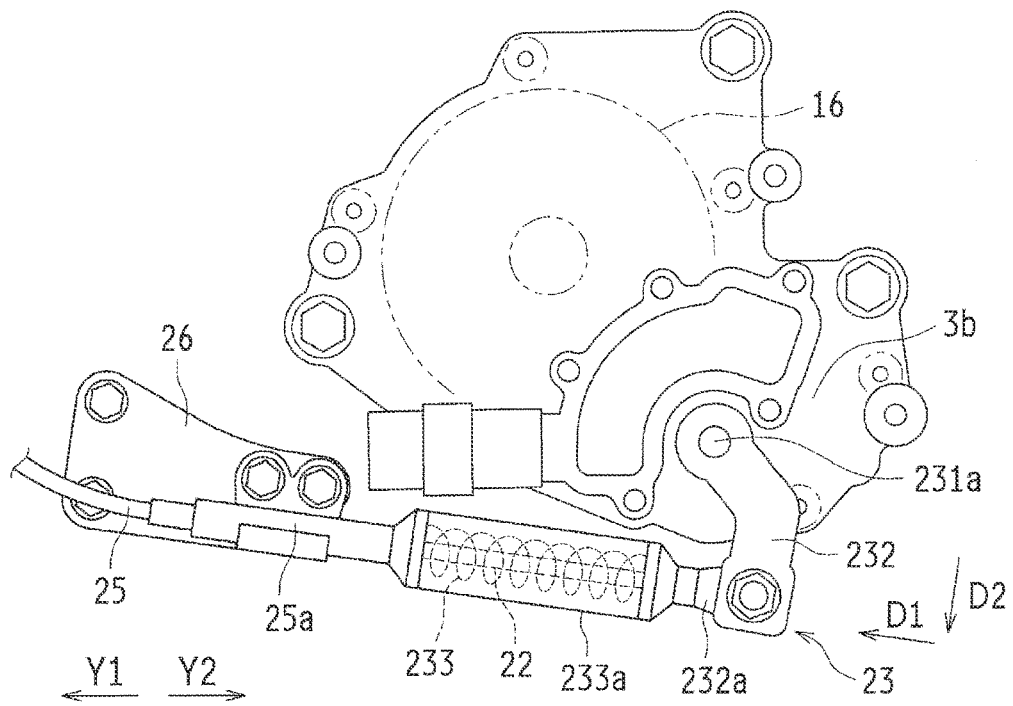
FIG. 6 is a side view that shows an idle motion mechanism of the manual release device.

The proximal end of the lever 232 is connected to the shaft 231a. The lever 232 is configured to turn integrally with the body portion 231 about the shaft 231a. As shown in FIG. 6, a relay member 232a is turnably provided at the distal end of the lever 232. The cable 22 that is pulled out from the other end 25a of the cable housing 25 is coupled to the relay member 232a. That is, the other end of the cable 22 is coupled to the distal end of the lever 232 via the relay member 232a. The distal end of the lever 232 is arranged below the body portion 231 and the turning center (shaft 231a) of the lever 232. The distal end of the lever 232 is arranged so as to be directed substantially downward. Specifically, when the body portion 231 is placed in the normal position, the distal end of the lever 232 is arranged slightly on the vehicle front side (Y2 direction side) with respect to a vertical line that passes through the turning center of the lever 232. The lever 232 is arranged outside a case 3b of the automatic transmission 3, and is coupled via the shaft 231a to the body portion 231 that is arranged inside the case 3b.

The cable 22 is arranged inside the helical compression spring 233. The helical compression spring 233 is provided between the other end 25a of the cable housing 25 and the relay member 232a. The other end 25a of the cable housing 25 is fixed to the bracket 26. The relay member 232a is provided at the distal end of the turnable lever 232. The helical compression spring 233 is arranged on the vehicle rear side (Y1 side) with respect to the lever 232. The helical compression spring 233 is configured to urge the lever 232 toward the vehicle front side. For this reason, the helical compression spring 233 is configured to urge the lever 232 such that the body portion 231 is located in the normal position. A retractable cylindrical cover 233a is provided between the other end 25a of the cable housing 25 and the relay member 232a so as to cover the helical compression spring 233 and the cable 22. The helical compression spring 233 is an example of the urging member according to the disclosure.

As shown in FIG. 1 and FIG. 2, the contact portion 234 is provided in a plate 234a, and is formed to protrude from the plate 234a toward the body portion 231. The contact portion 234 is arranged in the cutout portion 231b of the body portion 231. The plate 234a is provided so as to turn integrally with the shaft 14d. That is, the contact portion 234 is coupled to the shaft 14d via the plate 234a, and is configured to turn integrally with the shaft 14d.

In the thus configured idle motion mechanism 23, when the operating lever 21 is not operated (turned), the body portion 231 is arranged in the normal position by the urging force of the helical compression spring 233. At this time, as the shaft 14d and the detent plate 14 are turned by the electric motor 16 and the parking lock mechanism 1 is switched between the locked state and the unlocked state, the contact portion 234 moves along the cutout portion 231b. As shown in FIG. 1, when the parking lock mechanism 1 is in the unlocked state, the contact portion 234 is arranged at one end of the cutout portion 231b. As shown in FIG. 2, when the parking lock mechanism 1 is in the locked state, the contact portion 234 is arranged at the other end of the cutout portion 231b. Therefore, when the body portion 231 is placed in the normal position, it is possible to switch the parking lock mechanism 1 between the locked state and the unlocked state without interference with the idle motion mechanism 23.

The idle motion mechanism 23 is configured to, when the parking lock mechanism 1 is in the locked state, turn the detent plate 14 in the R2 direction by transmitting the operational force to the shaft 14d at the time when the operating lever 21 is operated to cause the body portion 231 to move from the normal position to the actuated position. Details at the time of this manual release will be described later.

The idle motion mechanism 23 is configured not to, when the parking lock mechanism 1 is in the unlocked state, transmit an operational force to the shaft 14d even when the operating lever 21 is operated to cause the body portion 231 to move from the normal position to the actuated position. This is because, as shown in FIG. 1, in the case of the unlocked state, the contact portion 234 is arranged at one end of the cutout portion 231b and, as a result, even when the body portion 231 is turned in the R2 direction, the other end of the cutout portion 231b just gets close to the contact portion 234, and the shaft 14d is not turned.

Next, the operation of the manual release device 2 at the time when the parking lock mechanism 1 in the locked state is forcibly switched to the unlocked state manually will be described with reference to FIG. 2, and FIG. 6 to FIG. 9.

When the parking lock mechanism 1 is in the locked state and before the operating lever 21 is operated, the body portion 231 is arranged in the normal position as shown in FIG. 2 by the urging force of the helical compression spring 233 in the idle motion mechanism 23. At this time, the contact portion 234 is arranged at the other end of the cutout portion 231b. As shown in FIG. 6, the distal end of the lever 232 is arranged slightly on the vehicle front side with respect to the vertical line that passes through the turning center of the lever 232.

Figure 7:
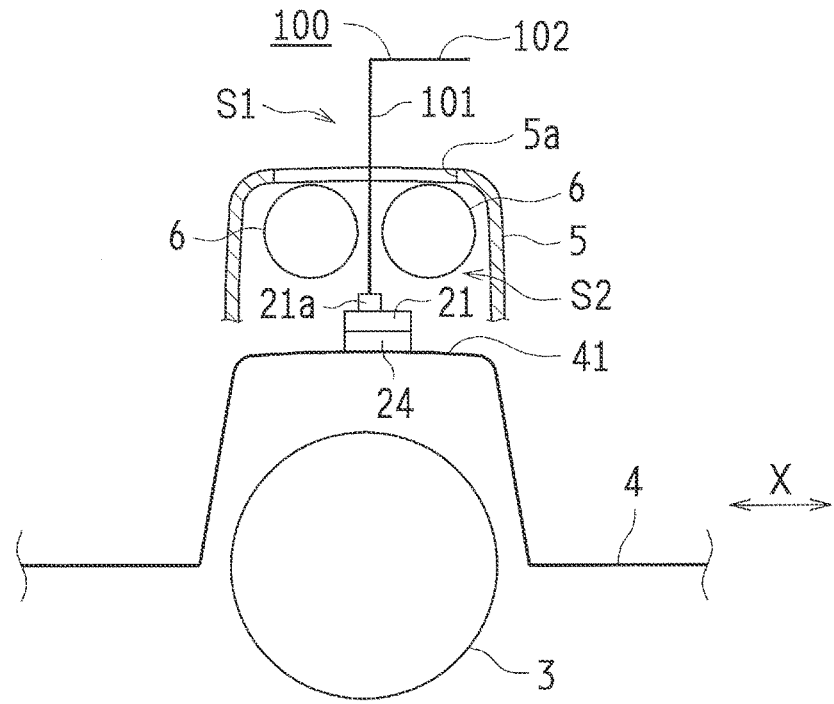
FIG. 7 is a schematic view that shows a state where a tool is coupled to the operating lever shown in FIG. 4.

At the time of manual release, initially, as shown in FIG. 7, the cover 51 (see FIG. 4) is removed from the opening 5a of the interior member 5. At this time, it is possible to visually check the protrusion 21a of the operating lever 21 from the living space S1 via the opening 5a. That is, the air conditioner ducts 6, the ECU (not shown), and the like, are provided in the space S2 so as not to overlap with the protrusion 21a in plan view. The tool 100 is coupled to the protrusion 21a of the operating lever 21 from the living space S1 via the opening 5a.

The tool 100 is, for example, an L box wrench. The tool 100 includes a shaft portion 101 and a grip portion 102. The shaft portion 101 has a distal end that is able to be coupled to the protrusion 21a. The grip portion 102 is provided at the proximal end of the shaft portion 101. The grip portion 102 is formed to extend from the proximal end of the shaft portion 101 in a direction perpendicular to the shaft portion 101.

The shaft portion 101 of the tool 100 is inserted into the space S2 via the opening 5a. The distal end of the shaft portion 101 is coupled to the protrusion 21a of the operating lever 21. At this time, the shaft portion 101 is arranged along the turning center of the operating lever 21. That is, the shaft portion 101 is arranged coaxially with the turning axis of the operating lever 21. The grip portion 102 is arranged in the living space S1.

By turning the grip portion 102 about the shaft portion 101 in this state, the operating lever 21 is turned integrally with the tool 100. For this reason, the cable 22 is pulled out from one end of the cable housing 25.

Figure 8:
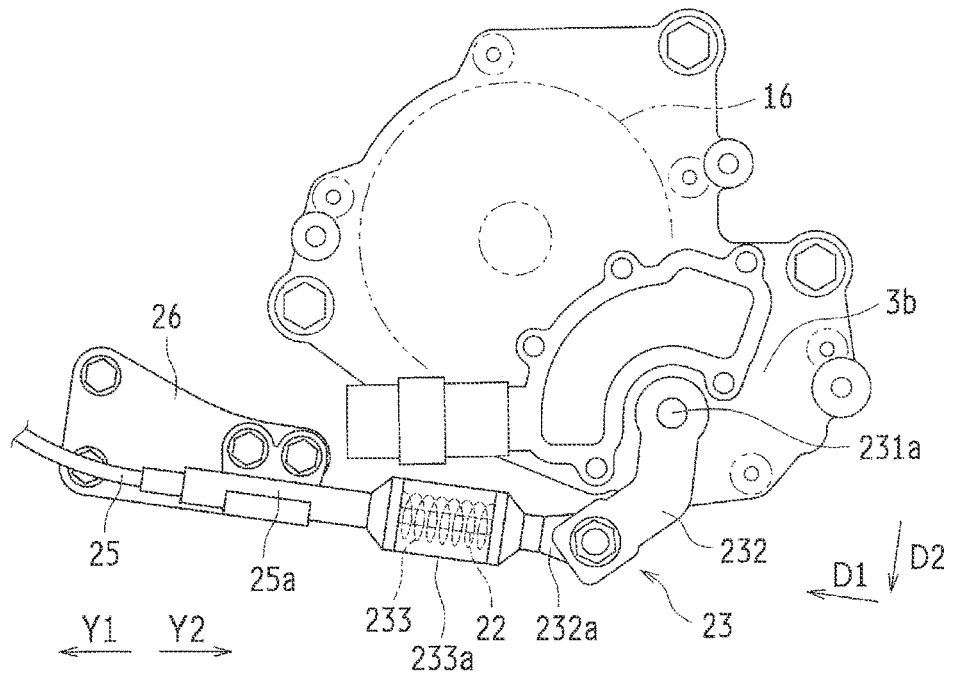
FIG. 8 is a side view that shows a state where a lever of the idle motion mechanism shown in FIG. 6 is turned.
Figure 9:
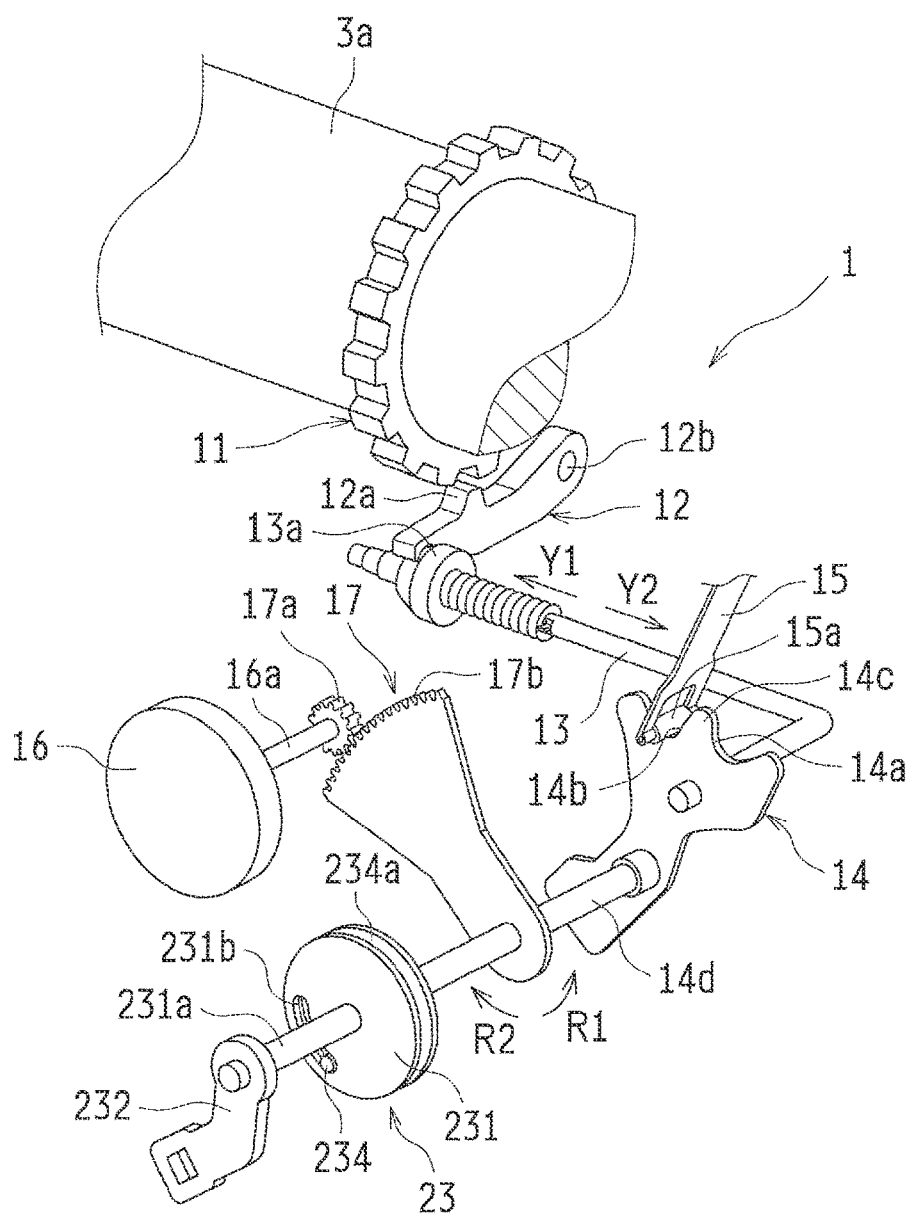
FIG. 9 is a view in which the parking lock mechanism shown in FIG. 2 has been switched by the manual release device into an unlocked state.

Thus, the cable 22 is drawn at the other end 25a of the cable housing 25, so, as shown in FIG. 8, the lever 232 is turned toward the vehicle rear side against the urging force of the helical compression spring 233 in the idle motion mechanism 23. For this reason, as shown in FIG. 9, the body portion 231 is turned from the normal position to the actuated position. At this time, the cutout portion 231b of the body portion 231 contacts (engages) the contact portion 234, and the shaft 14d and the detent plate 14 together with the body portion 231 are turned in the R2 direction. Thus, the parking lock mechanism 1 is switched from the locked state to the unlocked state. As shown in FIG. 9, when the body portion 231 is located in the actuated position, the distal end of the lever 232 is arranged on the vehicle rear side with respect to the vertical line that passes through the turning center of the lever 232, as shown in FIG. 8.

When the parking lock mechanism 1 is switched from the locked state to the unlocked state, a torque that is required to turn the shaft 14d is maximum at the time when the roller 15a of the detent spring 15 passes a point just before the peak of the crest 14c of the detent plate 14. This is because, until the roller 15a comes from the bottom of the P trough 14a and passes the peak of the crest 14c, turning of the detent plate 14 in the R2 direction is hindered by the detent spring 15, and, until the roller 15a passes the peak of the crest 14c and reaches the bottom of the NP trough 14b, turning of the detent plate 14 in the R2 direction is facilitated by the detent spring 15.

At the time when a torque that is required to turn the shaft 14d is maximum, a tangential direction at the time when the lever 232 turns coincides with the moving direction of the portion of the cable 22, at which the cable 22 is coupled to the lever 232. That is, the timing at which a torque that is required to turn the shaft 14d is maximum coincides with the timing at which a component that contributes to turning of the lever 232 within a force that acts on the distal end of the lever 232 via the cable 22 is maximum. For this reason, at the time when the roller 15a of the detent spring 15 passes through a point just before the peak of the crest 14c of the detent plate 14, the distal end of the lever 232 is configured to be directed in a direction (D2 direction) perpendicular to the moving direction (D1 direction) of the cable 22.

Advantageous Effects

In the present embodiment, as described above, by arranging the distal end of the lever 232 below the turning center of the lever 232, it is possible to reduce a load input to the helical compression spring 233 due to the self weight of the lever 232, so it is possible to improve the durability of the helical compression spring 233. Furthermore, since the number of peripheral components is small, it is possible to improve the flexibility of design, such as the length of the lever 232. By arranging the distal end of the lever 232 such that the distal end of the lever 232 is directed substantially downward, it is possible to reduce a load input to the helical compression spring 233 due to vibrations in the vertical direction of the vehicle, so it is possible to improve the durability of the helical compression spring 233.

In the present embodiment, by arranging the helical compression spring 233 on the vehicle rear side with respect to the lever 232 and urging the lever 232 toward the vehicle front side with the use of the helical compression spring 233, it is possible to suppress input of the inertia force of the lever 232 to the helical compression spring 233. Therefore, it is possible to improve the durability of the helical compression spring 233. The inertia force of the lever 232 is generated by an acceleration (negative acceleration) at the time when the vehicle is decelerated. The inertia force of the lever 232, which is generated by an acceleration (positive acceleration) at the time when the vehicle is accelerated, is input to the helical compression spring 233; however, the inertia force that is generated during acceleration tends to be smaller than the inertia force that is generated during deceleration, so it is not problematic.

In the present embodiment, by bringing the tangential direction at the time when the lever 232 turns into coincidence with the moving direction (D1 direction) of the cable 22 when a torque that is required to turn the shaft 14d is maximum, it is possible to efficiently exert an operational force (a force that pulls the cable 22 with the use of the operating lever 21) on the lever 232. Therefore, it is possible to suppress an increase in operational force that is required to turn the shaft 14d. Thus, it is not required to increase the load capacity of the cable 22, so it is possible to suppress an increase in the size of the cable 22.

ALTERNATIVE EMBODIMENTS

The embodiment described above is illustrative and not restrictive in all respects. Therefore, the technical scope of the disclosure should not be interpreted by only the above-described embodiment, and is defined on the basis of the appended claims. The technical scope of the disclosure encompasses equivalents to the appended claims and all modifications within the scope of the appended claims.

For example, in the present embodiment, an example in which the parking lock mechanism 1 is switched between the locked state and the unlocked state is described; however, the disclosure is not limited to this configuration. The parking lock mechanism may be configured to be switched among, for example, a P position, a D position, an N position and an R position. In this case, the parking lock mechanism is placed in a locked state in the case of the P position, and is placed in an unlocked state in the case of the other positions.

In the present embodiment, an example in which the lever 232 is arranged on the vehicle front side with respect to the helical compression spring 233 is described; however, the disclosure is not limited to this configuration. The lever may be arranged on the vehicle rear side with respect to the helical compression spring.

In the present embodiment, an example in which the tangential direction at the time when the lever 232 turns coincides with the moving direction (D1 direction) of the cable 22 when a torque that is required to turn the shaft 14d is maximum is described; however, the disclosure is not limited to this configuration. The tangential direction at the time when the lever turns may be configured not to coincide with the moving direction of the cable when a torque that is required to turn the shaft is maximum.

In the present embodiment, an example in which the tool 100 has an L shape is described; however, the disclosure is not limited to this configuration. The tool may have a T shape.

In the present embodiment, an example in which the operating lever 21 is provided on the floor tunnel 41 is described; however, the disclosure is not limited to this configuration. The operating lever may be provided on another high-stiffness portion.

In the present embodiment, an example in which the air conditioner ducts 6 and the ECU are provided in the space S2 between the floor tunnel 41 and the interior member 5 is described; however, the disclosure is not limited to this configuration. Another component other than the air conditioner ducts or the ECU may be provided in the space between the floor tunnel and the interior member.

In the present embodiment, an example in which the output shaft 16a of the electric motor 16 and the shaft 14d coupled to the detent plate 14 are arranged parallel to each other is described; however, the disclosure is not limited to this configuration. The output shaft of the electric motor and the shaft coupled to the detent plate may be arranged coaxially with each other.

In the present embodiment, an example in which the lever 232 is urged by the helical compression spring 233 is described; however, the disclosure is not limited to this configuration. The lever may be urged by another urging member other than the helical compression spring.

In the present embodiment, the cover 51 that closes the opening 5a may be the bottom plate of the console box.

In the present embodiment, the cable 22 may be formed of a single cable or may be formed of a plurality of cables tied together.

The disclosure is usable in a manual release device for a parking lock mechanism.

What is claimed is:

1. A manual release device for a parking lock mechanism that is configured to be switched by an actuator between a locked state and an unlocked state, the parking lock mechanism being configured to be manually switched into the unlocked state when the parking lock mechanism is in the locked state, the manual release device comprising:
   an operating lever;
   a cable coupled to the operating lever; and
   an idle motion mechanism provided between the cable and a shaft, the shaft being configured to be turned by the actuator, wherein
   the idle motion mechanism includes
      a body portion that is configured to turn between a normal position and an actuated position,
      a lever provided on the body portion,
      an urging member configured to urge the lever such that the body portion is located in the normal position, and
      a contact portion provided on the shaft,
   the cable is coupled to the lever,
   a distal end of the lever is arranged below a turning center of the lever,
   the parking lock mechanism is configured to, when the parking lock mechanism is in the locked state, be switched into the unlocked state as the body portion contacts the contact portion to cause the shaft to turn when the lever is turned against an urging force of the urging member as a result of operation of the operating lever to cause the body portion to turn from the normal position to the actuated position.

2. The manual release device according to claim 1, wherein
   the lever is arranged on a vehicle front side with respect to the urging member, and
   the lever is urged toward the vehicle front side by the urging member.

3. The manual release device according to claim 1, wherein
   when the parking lock mechanism is switched from the locked state to the unlocked state, as a result of operation of the operating lever, at the time when a torque required to turn the shaft is maximum, a tangential direction when the lever turns coincides with a moving direction of a portion of the cable, and
the portion of the cable is a portion at which the cable is coupled to the lever.

\* \* \* \* \*